US011990635B2

(12) United States Patent
Hayakawa

(10) Patent No.: US 11,990,635 B2
(45) Date of Patent: May 21, 2024

(54) FRAME STRUCTURE ASSEMBLY KIT, BATTERY MODULE, AND METHOD FOR MANUFACTURING BATTERY MODULE

(71) Applicant: NGK INSULATORS, LTD., Nagoya (JP)

(72) Inventor: Seiji Hayakawa, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 380 days.

(21) Appl. No.: 16/564,076

(22) Filed: Sep. 9, 2019

(65) Prior Publication Data

US 2020/0006729 A1 Jan. 2, 2020

Related U.S. Application Data

(63) Continuation of application No. PCT/JP2017/011161, filed on Mar. 21, 2017.

(51) Int. Cl.
*H01M 50/224* (2021.01)
*H01M 50/209* (2021.01)
*H01M 50/262* (2021.01)

(52) U.S. Cl.
CPC ....... *H01M 50/262* (2021.01); *H01M 50/209* (2021.01); *H01M 50/224* (2021.01)

(58) Field of Classification Search
CPC .................................................. H01M 50/20
See application file for complete search history.

(56) References Cited

U.S. PATENT DOCUMENTS 9,173,307 B2 * 10/2015 Lee ...................... H05K 5/0213
2001/0031392 A1 * 10/2001 Ogata ............... H01M 10/0413
429/99

(Continued)

FOREIGN PATENT DOCUMENTS

JP 2001-015090 A1 1/2001
JP 2003-142052 A1 5/2003

(Continued)

OTHER PUBLICATIONS

Japanese Office Action (Application No. 2019-506574) dated Aug. 27, 2020 (with English translation).

(Continued)

*Primary Examiner* — Maria Laios
*Assistant Examiner* — Jordan E Berresford
(74) *Attorney, Agent, or Firm* — BURR PATENT LAW, PLLC

(57) ABSTRACT

A frame structure assembly kit is provided. The frame structure assembly kit includes: a bottom frame structure including a plurality of longitudinal bottom frames and a plurality of lateral bottom frames assembled into a grid or ladder, wherein a part of the longitudinal bottom frames and/or the lateral bottom frames bends or extends upward to form at least one guide for determining the position of each battery unit; a top frame structure including a plurality of top longitudinal frames and a plurality of top lateral frames assembled into a grid or ladder; and a plurality of pillars having a length corresponding to the height of the battery units for connecting four corners of the bottom frame structure to the respective four corners of the top frame structure into a rectangular housing capable of accommodating the battery units.

28 Claims, 8 Drawing Sheets

(56) References Cited

U.S. PATENT DOCUMENTS

| | | | | |
|---|---|---|---|---|
| 2005/0281002 A1* | 12/2005 | Miller | ............... | H01M 10/6562 |
| | | | | 361/716 |
| 2013/0029192 A1 | 1/2013 | Oya | | |
| 2015/0303421 A1 | 10/2015 | Tazawa et al. | | |
| 2017/0331166 A1* | 11/2017 | Hasegawa | .............. | H01G 11/10 |

FOREIGN PATENT DOCUMENTS

| | | | |
|---|---|---|---|
| JP | 2012-069337 | A1 | 4/2012 |
| JP | 2012-216312 | A1 | 11/2012 |
| JP | 5573032 | B2 | 8/2014 |
| JP | 2014-191911 | A1 | 10/2014 |
| JP | 2015-204262 | A1 | 11/2015 |
| JP | 2016-081761 | A1 | 5/2016 |

OTHER PUBLICATIONS

International Search Report and Written Opinion (Application No. PCT/JP2017/011161 dated Jun. 20, 2017 (with English translation).

* cited by examiner

FRAME STRUCTURE ASSEMBLY KIT, BATTERY MODULE, AND METHOD FOR MANUFACTURING BATTERY MODULE

CROSS-REFERENCE TO RELATED APPLICATION

This application is a continuation application of PCT/JP2017/011161 filed Mar. 21, 2017, the entire contents of which are incorporated herein by reference.

BACKGROUND OF THE INVENTION

1. Field of the Invention

The present invention relates to a frame structure assembly kit, a battery module, and a method of manufacturing the battery module.

2. Description of the Related Art

In order to provide a battery device having large capacity and high output power, a plurality of battery units is usually arrayed into a battery module. For example, PTL 1 (JP5573032B) discloses a battery assembly that includes groups of battery stacks arrayed in a plane perpendicular to a stacking direction. The patent illustrates that each group of battery stacks is interposed between a first bracket and a second bracket and fixed to these brackets with connecting tools extending through holes formed in the battery stacks.

CITATION LIST

Patent Literature

PTL1: JP5573032B

BRIEF DESCRIPTION OF THE INVENTION

The battery assembly disclosed in PTL 1 (JP5573032B) includes the groups of battery stacks that are interposed between the first brackets extending in the direction of the array of the groups of battery stacks and second brackets extending in a direction perpendicular to the direction of the array. Since the entire surfaces of the two sides in the groups of battery stacks are not covered in this configuration, a reduction in weight of the battery assembly is achieved. The assembly also has high torsion resistance and vibration resistance. Unfortunately, the configuration in PTL 1 has some disadvantages. For example, the brackets protect only parts of the peripheral edges of the groups of battery stacks; hence, the battery is readily damaged by falling or collision. In addition, each group of battery stacks requires four fastening sites and thus requires many connectors and many assembly processes, resulting in increases in costs. Since the first bracket are not in direct contact with the second bracket, interposition of the groups of battery stacks between these brackets is likely to apply excess load to the groups of battery stacks, resulting in a high risk of damage.

The present inventors have discovered that a battery module accommodating battery units can be readily assembled with a frame structure assembly kit including a predetermined bottom frame structure, a predetermined top frame structure, and a plurality of pillars without excess load to the battery units at low cost. The resulting module has a robust structure and exhibits high heat dissipation and a reduced weight.

Accordingly, an object of the present invention is to provide an assembly kit to manufacture a battery module, accommodating a plurality of battery units, that has a robust structure, exhibits high heat dissipation and has a reduced weight without application of excess load to the battery unit, and a method of readily manufacturing the battery module at low costs. Another object of the present invention is to provide a battery module manufactured by the method with the assembly kit.

According to one embodiment of the present invention, a frame structure assembly kit is provided for accommodating a plurality of battery units in the form of a battery module. The frame structure assembly kit comprises:

a bottom frame structure including a plurality of longitudinal bottom frames and a plurality of lateral bottom frames assembled into a grid or ladder, wherein a part of the longitudinal bottom frames and/or the lateral bottom frames bends or extends upward to form at least one guide for determining the position of each battery unit;

a top frame structure including a plurality of top longitudinal frames and a plurality of top lateral frames assembled into a grid or ladder; and a plurality of pillars having a length corresponding to the height of the battery units for connecting four corners of the bottom frame structure to the respective four corners of the top frame structure into a rectangular housing capable of accommodating the plurality of battery units.

According to another embodiment of the present invention, a method of manufacturing the battery module using the frame structure assembly kit is provided. The method comprises:

providing the frame structure assembly kit;

conducting each of the battery units along the respective guides and placing the battery unit at predetermined positions on the bottom frame structure, thereby regularly mounting the battery units onto the bottom frame structure;

connecting the battery units in series or in parallel into the battery module; and fixing the top frame structure to the bottom frame structure with the pillars therebetween into a frame structure having a rectangular housing accommodating the battery units.

According to another embodiment of the present invention, a battery module is provided. The battery module comprises:

the frame structure having the rectangular housing produced using the frame structure assembly kit; and the battery units accommodated in the frame structure and regularly placed along the guides;

DETAILED DESCRIPTION OF THE INVENTION

Frame Structure Assembly Kit

Figure 1:
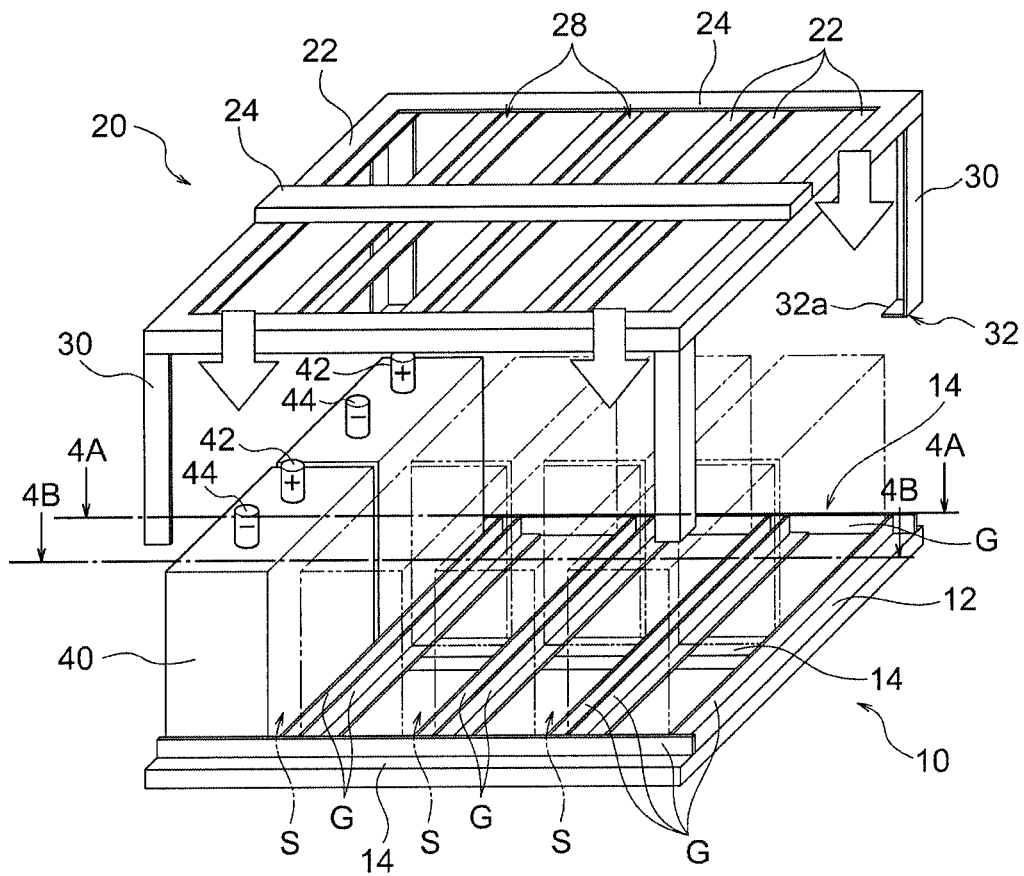
FIG. 1 is a perspective view schematically illustrating a method of manufacturing a battery module using a frame assembly kit according to the present invention.
Figure 2:
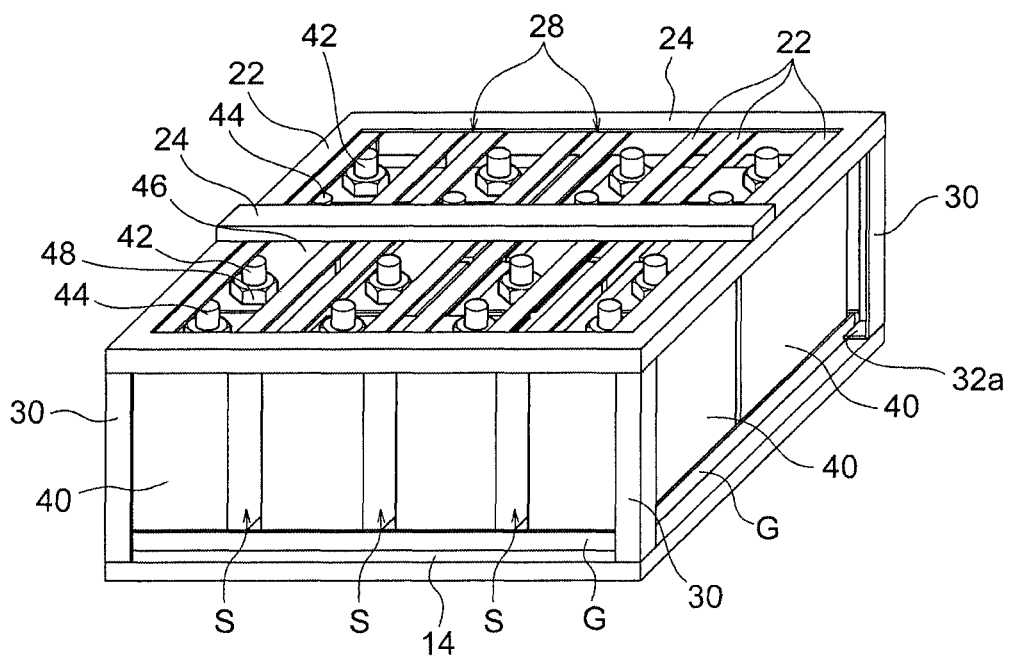
FIG. 2 is a perspective view schematically illustrating an example battery module manufactured using the frame assembly kit shown in FIG. 1.

The present invention relates to a frame structure assembly kit for accommodating a plurality of battery units in the form of a battery module. An example of such a frame structure assembly kit is shown in FIG. 1. The frame assembly kit shown in FIG. 1 includes a bottom frame structure 10, a top frame structure 20, and a plurality of pillars 30. The bottom frame structure 10 includes a plurality of longitudinal bottom frames 12 and a plurality of lateral bottom frames 14 assembled into a grid or ladder. The bottom frame structure 10 is configured such that a part of the longitudinal bottom frames 12 and/or the lateral bottom frames 14 of the bottom frame structure 10 bends or extends upward to form at least one guide G for determining the position of each battery unit. The top frame structure 20 includes a plurality of longitudinal top frames 22 and a plurality of lateral top frames 24 assembled into a grid or ladder, and the top frame structure typically has a shape and a size adaptable to the bottom frame structure 10. For example, in the case that the top frame structure 20 faces the bottom frame structure 10, the longitudinal top frame 22 and the lateral top frame 24, respectively, are located at positions so as to face the longitudinal bottom frame 12 and the lateral bottom frame 14. The plurality of pillars 30 are joints for connecting four corners of the bottom frame structure 10 to the respective four corners of the top frame structure 20 to provide a rectangular housing that can accommodate a plurality of battery units 40, and have a length corresponding to the height of the battery unit 40. The frame structure assembly kit including the bottom frame structure 10, the top frame structure 20, and the pillars 30 can facilitate production of a battery module at low costs and without application of excess load to the battery unit as shown in FIG. 2. The battery module accommodating the battery units 40 has a robust structure, exhibits high heat dissipation, and has a reduced weight. These advantages will be illustrated as follows.

(i) High Heat Dissipation and Reduced Weight

The battery module assembled using the frame structure assembly kit in the present invention exhibits high heat dissipation and has a reduced weight. Since the frame structure assembly kit includes the bottom frame structure 10, the top frame structure 20, and the plurality of pillars 30 as main components, a frame structure assembled using these components is not a closed box surrounded by flat walls, but a rectangular housing basically composed of frames, as shown in FIG. 2. In this configuration, the assembled frame structure includes many open areas. Since the battery unit 40 in the frame structure is exposed to the outside air, the frame structure exhibits effective heat dissipation. The frame structure has a reduced weight because the structure has many open areas.

(ii) Robust Structure

A battery module having a robust structure can be assembled using the frame structure assembly kit of the present invention. The frame structure assembly kit includes the bottom frame structure 10, the top frame structure 20, and the pillars 30 as main components, among which the bottom frame structure 10 and the top frame structure 20 are both assembled into a grid or ladder so that these frame structures are sufficiently reinforced. The pillars 30 connect four corners of the reinforced bottom frame structure 10 to the respective four corners of the reinforced top frame structure 20 to give a rectangular housing that can accommodate a plurality of battery units 40. The rectangular housing usually has high torsion resistance and vibration resistance, and the frame structure exhibits greatly robust properties in combination with the grid or ladder in the bottom frame structure 10 and the top frame structure 20. As a result, the damage of the battery by falling or collision can be effectively prevented in the assembled frame structure, unlike the bracket structure in PTL 1 in which the peripheral edges of the groups of battery stacks are only partially protected by the bracket, because all peripheral edges of the battery unit 40 are supported or protected by the frame in the assembled frame structure. It is preferred that the battery module does not deform even in the falling from about 10 cm high to avoid the damage of the battery unit 40

(iii) Production at Low Cost

A battery module can be assembled at low costs using the frame structure assembly kit in the present invention. The frame structure assembly kit includes the bottom frame structure 10, the top frame structure 20, and the pillars 30 as main components. Each of these main components may be an inexpensive and commonly available elongated member (for example, an L-shaped angle member) as shown in FIG. 1. Such an elongated member may be a general steel plate, and can be reinforced by, for example, a simple bending and welding process to produce the bottom frame structure 10 and the top frame structure 20. Since each of the bottom frame structure 10 and the top frame structure 20 has an integrated structure, the number of components, the number of fastenings, and the number of fastening steps can be reduced in an assembling process, resulting in leading to low manufacturing costs. In contrast, the bracket structure of PTL 1 requires fastenings at four positions for each battery stack, and a large number of connecting tools and processes, resulting in an increase in cost. Such a cost can be greatly reduced according to the present invention.

(iv) Ease of Production

A battery module can be readily assembled using the frame structure assembly kit in the present invention. In the present invention, the frame structure of the rectangular housing can be formed merely by fastening the top frame structure 20 to the bottom frame structure 10 with the pillars 30 therebetween. In addition, battery units 40 are regularly disposed in predetermined positions along guides G onto the bottom frame structure 10. The guides G facilitate settlement of the battery units 40 at appropriate positions, resulting in a decrease in assembling steps. Accordingly, the battery module can be readily assembled. In contrast, the bracket structure of PTL 1 requires fastenings at four positions for each battery stack and a large number of connecting tools and steps, resulting in complicated production. Such complication can be greatly reduced according to the present invention.

(v) Production without Application of Excess Load to Battery Units

A battery module can be assembled without application of excess load to the battery units using the frame structure assembly kit in the present invention. In the present invention, the pillars 30 connect four corners of the bottom frame structure 10 to the respective four corners of the top frame structure 20 to provide a rectangular housing that can accommodate a plurality of battery units 40. Since the pillars 30 are interposed between the bottom frame structure 10 and the top frame structure 20, the battery units 40 do not receive the weight of the top frame structure 20 nor the force for fastening the bottom frame structure 10 to the top frame structure 20. Accordingly, excess load to battery unit 40 can be avoided. In contrast, since a first bracket is not in direct contact with a second bracket in the bracket structure of PTL 1, interposition of the groups of battery stacks between these brackets readily causes excess load to the groups of the battery stacks, resulting in damaging the groups of the battery stacks. Conveniently, the present invention does not lead to such a risk.

In the bottom frame structure 10, the longitudinal bottom frames 12 and lateral bottom frames 14 are assembled into a grid or ladder. The bottom frame structure 10 may be preferably an integrated structure from the viewpoint of ready assembly into the battery module. However, the bottom frame structure 10 may be a combination of a plurality of frame structural segments. In this combination, these structural segments are appropriately combined to form the bottom frame structure 10 at the time of or prior to assembly into the battery module. A reduced number of frame structure segments, for example, two to four segments, especially two segments, that can constitute the bottom frame structure 10 is preferred from the viewpoint of ease of assembly.

Figure 3A:
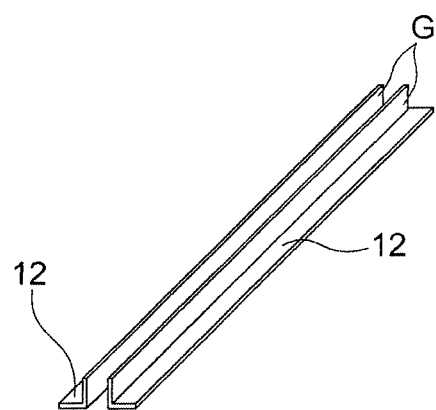
FIG. 3A is a perspective view illustrating an example pair of longitudinal bottom frames.
Figure 3B:
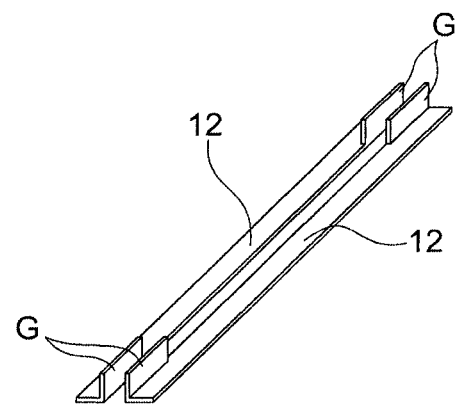
FIG. 3B is a perspective view illustrating another example pair of longitudinal bottom frames.
Figure 3C:
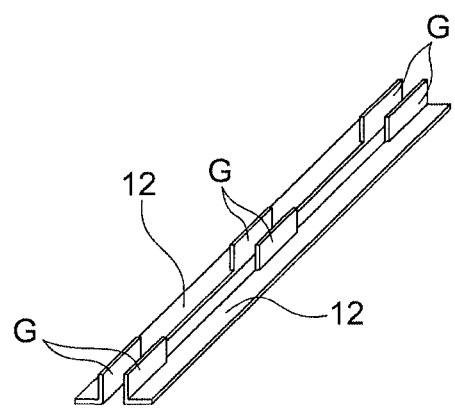
FIG. 3C is a perspective view illustrating another example pair of longitudinal bottom frames.
Figure 3D:
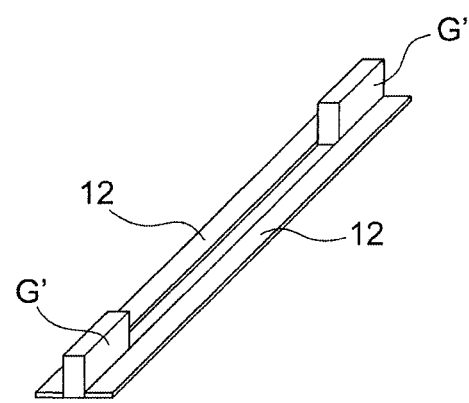
FIG. 3D is a perspective view illustrating another example pair of longitudinal bottom frames with spacers interposed therebetween.
Figure 3E:
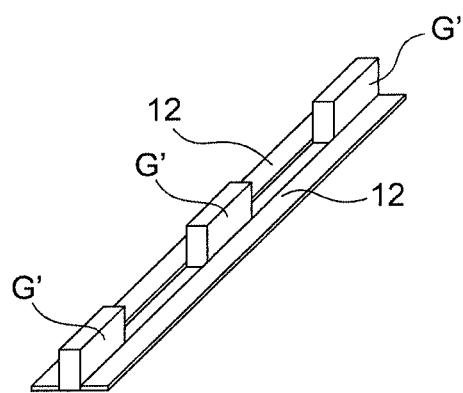
FIG. 3E is a perspective view illustrating another example pair of longitudinal bottom frames with spacers interposed therebetween.
Figure 3F:
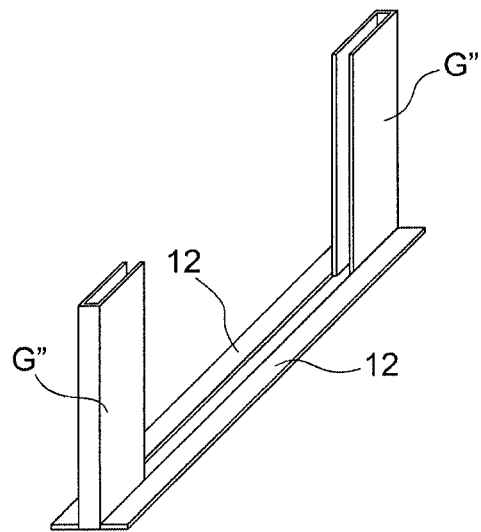
FIG. 3F is a perspective view illustrating another example pair of longitudinal bottom frames with spacers interposed therebetween.

The bottom frame structure 10 is configured such that a part of the longitudinal bottom frame 12 and/or the lateral bottom frame 14 bends or extends upward to form at least one guide G for determining the position of each battery unit to be mounted. The guides can readily determine the positions of the battery units 40, and also effectively prevent the misalignment of the battery units 40 after the battery module is assembled. The guides G may have any upward shape projecting from the longitudinal bottom frames 12 and/or the lateral bottom frames 14. Preferred examples of the shape of the guide include a plate, a protrusion, a block, an elongated beam having a U-shaped cross-section, and a combination thereof. Particularly preferred is a plate (i.e., a guide plate). For example, as shown in FIG. 3A, the guides G having a plate shape (i.e., guide plates) preferably extend over the entire length of the longitudinal bottom frame 12. Alternatively, the guides G may be formed only in partial regions of the length of the longitudinal bottom frame 12. For example, as shown in FIG. 3B, the guides G with a plate shape are provided only at two ends of the longitudinal bottom frame 12. In an alternative embodiment, as shown in FIG. 3C, the plate guides G may be disposed at two ends and a central portion of the longitudinal bottom frame 12. The guides G may be disposed so as to connect a pair of adjacent longitudinal bottom frames 12 with a predetermined distance to form a spacer. For example, as shown in FIG. 3D, blocks of guides G' are formed between two ends of a pair of adjacent longitudinal bottom frames 12, which may function as a spacer that separates the longitudinal bottom frames 12 at a predetermined distance. In addition, as shown in FIG. 3E, blocks of guides G' may be disposed not only at two ends but also at a central portion of a pair of adjacent longitudinal bottom frames 12. The spacer may be in any shape besides the block shape. For example, as shown in FIG. 3F, the guides G" each have an elongated U-shaped cross-section at two ends of a pair of adjacent longitudinal bottom frames 12 and function as a spacer that separate the pair of adjacent longitudinal bottom frames 12 at a predetermined distance. Although FIGS. 3A to 3F illustrate the longitudinal bottom frame 12 as examples, these shapes for the longitudinal bottom frame 12 can be also applied to the lateral bottom frame 14.

In a particularly preferred embodiment, the longitudinal bottom frame 12 and/or the lateral bottom frame 14 is composed of an L-shaped angle member and its upwardly bent portion functions as the guide G. The L-shaped angle member, which is inexpensive and commonly available, leads to a significant reduction in manufacturing cost.

The battery unit 40 typically has a rectangular shape. The battery unit 40 however may have any shape other than the rectangular shape, and can tolerate some unevenness as long as the outline of the battery unit can be visually recognized as a rectangular shape.

Figure 4A:
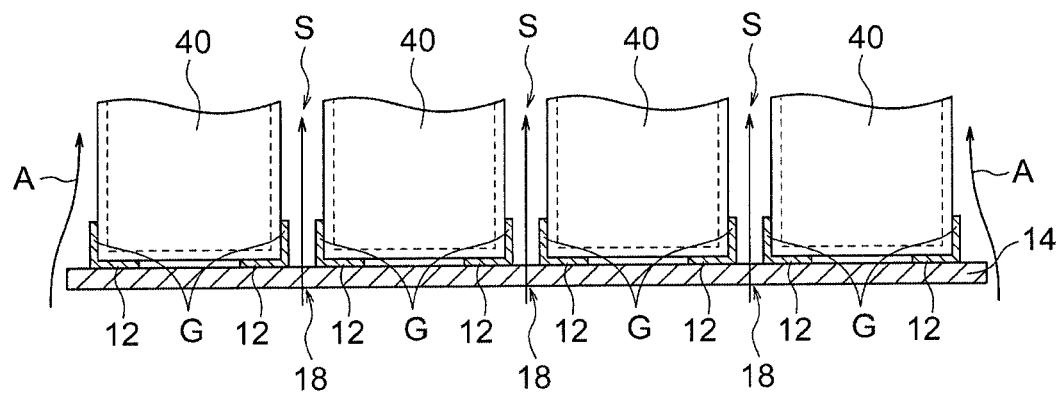
FIG. 4A is a cross-sectional view along line 4A-4A of the bottom frame structure shown in FIG. 1.
Figure 4B:
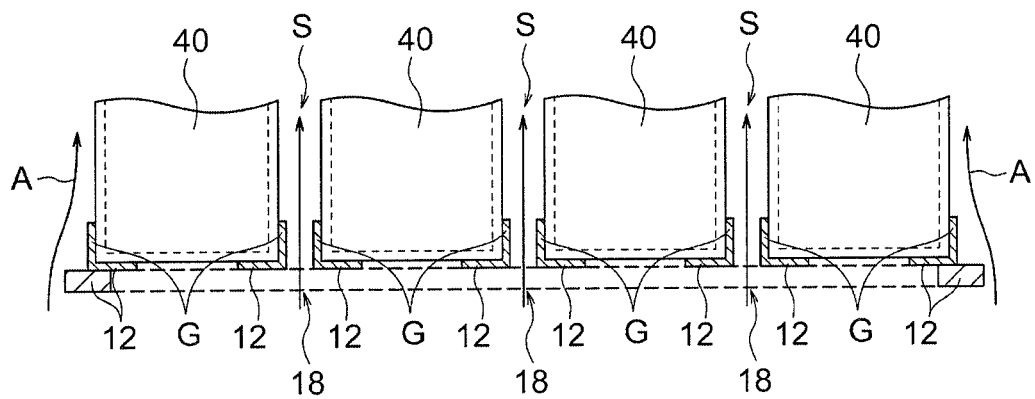
FIG. 4B is a cross-sectional view along line 4B-4B of the bottom frame structure shown in FIG. 1.

In the case of a rectangular battery unit 40, the guide G preferably determines the position of the battery unit 40 such that the longitudinal direction of the battery unit 40 can be directed parallel to the longitudinal bottom frame 12. Such a geometry can readily form a spacer region S that enables air flow or heat radiation in the vicinity of the side face having a larger area of the battery unit 40, resulting in an improvement in the heat dissipation, as will be described later. Since the battery unit 40 entails heat generation, the heat should be efficiently dissipated from the battery units mounted into a module. The layout of battery units promotes the heat dissipation. Securing of the spacer region S can reduce elevation of temperature of individual battery units 40 and prevent temperature imbalance in the battery module. In particular, desirable heat dissipation can be achieved only by natural convection without an additional mechanism, such as a forced cooling mechanism. For example, in the bottom frame structure 10 as shown in FIGS. 1, 2, 4A and 4B, the guides G adjacent in the lateral direction are separated to define the spacer regions S, thereby the mounted battery units 40 can be mutually separated. In this case, as shown in FIGS. 4A and 4B, the bottom frame structure 10 preferably has bottom air vents 18 just below the spacer regions S. The bottom air vents 18 enable air flow A through the spacer regions S, thereby the heat dissipation can be improved between adjacent battery units 40. The bottom air vents 18 are preferably defined by the longitudinal bottom frames 12 separately disposed from one another because this configuration is the simplest and can be manufactured at low costs. In other words, the spacer regions S can be readily defined at low costs with a small number of components, a small number of steps, and a reduced weight using an inexpensive and commonly available elongated member (e.g., an L-shaped angle member). Since the stacked batteries are fastened in the bracket structure of PTL 1, no gap is provided between the batteries, resulting in high temperature elevation (if the gap is provided by a gap material, an increase in the number of components, the number of steps and the weight leads to an increase in cost.) In contrast, securing of the spacer regions S in the present embodiment can decrease the elevation of temperature in each battery unit 40 and prevent the temperature imbalance in the battery module. It should be understood that the spacer region S may be formed by a guide that functions as a spacer, such as the block guide G' or elongated beam guide G" having U-shaped cross-section, shown in FIGS. 3D to 3F.

The bottom frame structure 10 preferably has guides that can mount battery units 40 two or more in column and two or more in row, particularly preferably two in column and four in row.

The bottom frame structure 10 may further include bottom reinforcing beams that reinforce the longitudinal bottom frames 12 and/or the lateral bottom frames 14 from the viewpoint of enhancing the strength. The bottom reinforcement beams may be provided parallel to the longitudinal bottom frames 12 or the lateral bottom frames 14, or may be provided obliquely to the bottom frames.

In the top frame structure 20, similar to the bottom frame structure 10, a plurality of longitudinal top frames 22 and a plurality of lateral top frames 24 are assembled into a grid or ladder. The top frame structure 20 has a shape and size adaptable to the bottom frame structure 10, and connects to the bottom frame structure 10 with the pillars 30 therebetween to give a rectangular housing capable of accommodating the battery unit 40. The top frame structure 20 is also preferably an integrated structure to facilitate the assembly into the battery module. Alternatively, the top frame structure 20 may be a combination of a plurality of frame structural segments. In this combination, these structural segments are appropriately combined to form the top frame structure 20 at the time of or prior to the assembly into the battery module. A smaller number of frame structure segments, for example, two to four segments, especially two segments, that can constitute the top frame structure 20 is preferred from the viewpoint of ease of assembly.

Optionally, the top frame structure 20 may be configured such that a part of the longitudinal top frame 22 and/or the lateral top frame 24 bends or extends downward to form a guide for determining the position of the upper end of each battery units 40. The formation of the guide can effectively prevent misalignment of the battery unit 40 after the battery module is assembled. The guide, which extends downward from the longitudinal top frame 22 and/or the lateral top frame 24, may have any shape. Preferred examples of the shape of the guide include a plate, a protrusion, a block, an elongated beam having a U-shaped cross-section, and a combination thereof. A particularly preferred example is a plate (i.e., a guide plate). For example, the guides may be formed in a plate (i.e., as a guide plate) over the entire longitudinal region of the longitudinal top frame 22, like the longitudinal bottom frame 12 shown in FIG. 3A. Alternatively, the guides may be formed only in a partial longitudinal region of the longitudinal top frame 22, like the longitudinal bottom frame 12 shown in FIGS. 3B and 3C. The guides may be disposed so as to connect a pair of adjacent longitudinal top frames 22 with a predetermined distance therebetween to define a spacer, like the longitudinal bottom frame 12 shown in FIGS. 3D to 3F. Although the longitudinal top frame 22 is illustrated as examples, the various forms described above for the longitudinal top frame 22 can be also applied to the lateral top frame 24. In the case that the longitudinal top frame 22 and/or the lateral top frame 24 has a guide, the longitudinal top frame 22 and/or the lateral top frame 24 may be preferably an L-shaped angle member, and the bent portion of the L-shaped angle member may constitute the guide. The L-shaped angle member, which is an inexpensive and commonly available elongated member, leads to a significant reduction in manufacturing cost. In the case that the top frame structure 20 has a guide, the guide is preferably configured to be paired with the guide G of the bottom frame structure 10 to define an area or a space where each battery units 40 are to be placed. Similar to the guide G of the bottom frame structure 10, the guide of the top frame structure is preferably configured such that a plurality of battery units 40 can be placed preferably two or more in column and two or more in row, particularly preferably two in column and four in row.

In the case of a rectangular battery unit 40, the guide G preferably determine the mounting position of the battery units 40 such that the longitudinal direction of the battery unit 40 can be directed parallel to the longitudinal bottom frame 12, as described above. Since the longitudinal surface of the battery unit 40 radiates more heat, high heat dissipation is required, and the positioning by the guide G can promote the heat dissipation on such a longitudinal surface. In detail, as shown in FIGS. 1, 2, 4A and 4B, the guides G adjacent in the lateral direction in the bottom frame structure 10 are separated to define the spacer regions S, thereby the battery units 40 can be preferably spaced apart from one another. In this case, as shown in FIGS. 1 and 2, the top frame structure 20 preferably has top air vents 28 in the area corresponding to the spacer regions S. The top air vents 28 enable air flow through the spacer regions S to enhance the heat dissipation between adjacent battery units 40. The top air vents 28 are preferably formed so as to separate the longitudinal top frames 22 from one another because this configuration is the simplest and can be manufactured at low costs. The spacer regions S can be defined by an inexpensive and commonly available elongated member (e.g., an L-shaped angle member). It should be understood that the spacer regions S may be defined by a block guide or a U-shaped cross-sectional elongated guide as described above with FIGS. 3D to 3F as examples. It is particularly preferred that the bottom frame structure 10 has the bottom air vents 18 and the top frame structure 20 has the top air vents 28 to further enhance the air flow and the heat dissipation. Such air vents can flow the cooling air from the bottom to the top, resulting in high cooling efficiency.

The top frame structure 20 may further include a top reinforcing beams that reinforce the longitudinal top frame 22 and/or the lateral top frame 24 to improve the strength. The top reinforcing beams may be disposed parallel to the longitudinal top frame 22 or the lateral top frame 24, or may be disposed obliquely to the top frames.

The pillars 30 have a length corresponding to the height of the battery unit 40, and connects four corners of the bottom frame structure 10 to the respective four corners of the top frame structure 20 to form a rectangular housing for accommodating a plurality of battery units 40. The length of the pillars 30 corresponding to the height of the battery unit 40 indicates that the height of the pillar 30 is substantially the same as the height of the battery unit 40 in the rectangular housing accommodating the battery units 40. Such a length of the pillars can stably hold the battery units 40, accommodated in the frame structure, in the form interposed between the top frame structure 20 and the bottom frame structure 10, thereby the battery units 40 can be prevented from falling-down. Additional pillar (not shown in the drawing) may be provided at a position other than the four corners of the bottom frame structure 10 or the four corners of the top frame structure 20.

Each of the pillars 30 is preferably fixed to a corner of either the top frame structure 20 or the bottom frame structure 10, thereby each of the pillars 30 is preferably assembled into parts of the top frame structure 20 or the bottom frame structure 10. For example, as shown in FIG. 1, the pillars 30 are fixed to the corners (preferably four corners) of the top frame structure 20, and the pillars 30 are preferably assembled into parts of the top frame structure 20. Alternatively, the pillars 30 may be fixed to the corners (preferably four corners) of the bottom frame structure 10, and the pillars 30 may be incorporated into parts of the bottom frame structure 10 although not shown in the drawing. Alternatively, the top frame structure 20 may have at least one pillar 30 only at at least one predetermined corner, and the bottom frame structure 10 may have at least one pillar 30 at at least one corner not corresponding to the at least one predetermined corner of the top frame structure 20. Alternatively, the bottom frame structure 10 and the top frame structure 20 may have short pillars at the respective corners (preferably four corners) that may be connected each other to complete the pillars 30 having the length corresponding to the height of the battery unit 40 when the bottom frame structure 10 are combined with the top frame structure 20. In any case, the bottom frame structure 10 and/or the top frame structure 20 are preliminarily provided with the pillars 30; hence, a rectangular housing can be formed merely by combining the bottom frame structure 10 with the top frame structure 20. Accordingly, the number of components, the number of fastenings, and the number of fastening steps can be further reduced at the time of assembly.

The pillars 30 may be preferably composed of an L-shaped angle member. The L-shaped angle member is an inexpensive and commonly available elongated beam that contributes to a significant reduction in manufacturing cost. The L-shaped angle member used in the pillar have an advantage in that such a member can be commonly used in the longitudinal bottom frame 12, the lateral bottom frame 14, the longitudinal top frame 22 and/or the lateral top frame 24.

All the bottom frame structure 10, the top frame structure 20 and the pillars 30 are preferably made of metal. Preferred examples of such metals include steel, aluminum, aluminum alloy, and stainless steel, in particular aluminum and aluminum alloy. All these metals are inexpensive and have high strength. The bottom frame structure 10, the top frame structure 20, and/or the pillars 30 are preferably made of a porous material for further weight reduction.

Each of the pillars 30 preferably has an engaging portion 32 engageable with the bottom frame structure 10 or the top frame structure 20 at one end of these structures. The engaging portion 32 preferably allows one end of the pillar 30 to be detachably fastened to the bottom frame structure 10 or the top frame structure 20 without welding. The frame structure can be disassembled (e.g., the top frame structure 20 can be detached) as needed, which configuration can facilitate the operations such as maintenance and replacement of the battery units 40. For example, as shown in FIG. 1, the engaging portion 32 preferably has an end plate 32a that can come into surface contact with the bottom frame structure 10 or the top frame structure 20. In this case, the end plate 32a is more preferably fastenable to the bottom frame structure 10 or the top frame structure 20 with a fastener (not shown in the drawing). The end plate at the engaging portion can prevent the battery units from being excessively loaded. For example, the dimensional control within the frame structure and the control of crush margin in the cushioning material described later can be facilitated. The end plates 32a may have holes engageable with the fastener. In the bottom frame structure 10 or the top frame structure 20, portions in surface contact with the end plates 32a may also have holes engageable with the fastener. Examples of such fasteners include bolts and nuts.

Battery Module and Production Thereof

A battery module that accommodates a plurality of battery units, has a robust structure, exhibits high heat dissipation and has a reduced weight can be readily manufactured at low costs and without application of excess load to the battery unit using the frame structure assembly kit as described above. Such a battery module includes a frame structure having a rectangular housing manufactured using a frame structure assembly kit, for example, as shown in FIG. 2, and a plurality of battery units 40 that are accommodated in the frame structure and regularly mounted along the guide G.

The battery module in the present invention may be manufactured by any process using the frame structure assembly kit. A preferred process of manufacturing the battery module using the frame structure assembly kit includes the steps of: (1) providing a frame structure assembly kit; (2) disposing a plurality of battery units; (3) connecting the battery units; and (4) forming a rectangular housing. Each step will be described below.

(1) Provision of Frame Structure Assembly Kit

A frame structure assembly kit as described above is provided. In this provision, a bottom frame structure 10 may be placed at a desired site to be a base for the assembly of battery module.

Before mounting the battery units 40, cushioning materials may be disposed on areas of the battery units 40 to be mounted in the bottom frame structure 10. In this case, the cushioning materials are interposed between the bottom frame structure 10 and the battery units 40. The cushioning materials can disperse the load and the impact given by the battery units 40 to the bottom frame structure 10 to prevent the deformation and damage of the bottom frame structure 10 and the battery units 40. Preferred examples of the cushioning materials include a rubber sheet.

(2) Mount of Multiple Battery Units

Each of the battery units 40 is mounted at a predetermined position on the bottom frame structure 10 along the corresponding guide G, thereby the multiple battery units 40 are regularly mounted on the bottom frame structure 10. The guides G can allow the battery units 40 to readily sit at proper positions, resulting in ready assembly of the battery module.

The battery units 40 preferably includes alkaline secondary batteries accommodated in a resin container. Examples of the alkaline secondary batteries include nickel-zinc secondary batteries and zinc-air secondary batteries, preferably nickel-zinc secondary batteries. Since a plurality of alkaline secondary cells (e.g., nickel-zinc secondary battery and zinc-air secondary battery) are accommodated in the form of a battery assembly or a battery module in the battery unit 40, a battery having large capacity and high output power can be preferably provided. As described above, the battery unit 40 preferably has a rectangular shape.

(3) Connection of Battery Units

Figure 5:
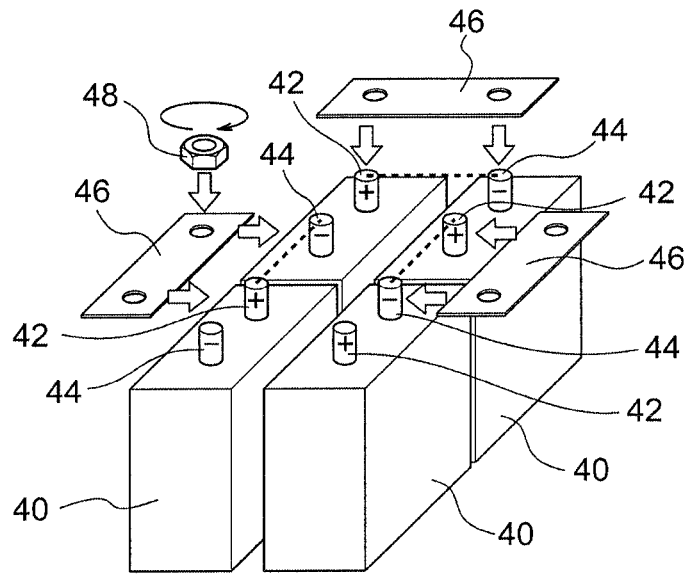
FIG. 5 is an exploded perspective view illustrating an example connection of battery units.

The battery units 40 are connected in series or in parallel to form a battery module. Preferred is in-series connection. When the battery units 40 are connected in series, the battery units 40 are preferably disposed such that positive electrode terminals 42 and negative electrode terminals 44 of adjacent battery units 40 are alternately positioned, as shown in FIG. 5. In the connection of multiple battery units 40, the positive electrode terminal 42 of one battery unit 40 is preferably connected to the negative electrode terminal 44 of the adjacent battery unit 40 through the conductive joint 46, resulting in space saving and ease of the connection. The conductive joint 46 is typically a flat plate terminal or a flexible conductor, and may be an inexpensive and commonly available conductive member, such as a metal plate and a bus bar. The joint 46 may be more preferably fixed to the positive electrode terminal 42 and the negative electrode terminal 44 with a fastener 48, thereby the battery units 40 may be fixed from one another. In this step, the battery units 40 can be readily connected in series in a limited space, and fixed from one another at their top faces.

Figure 6:
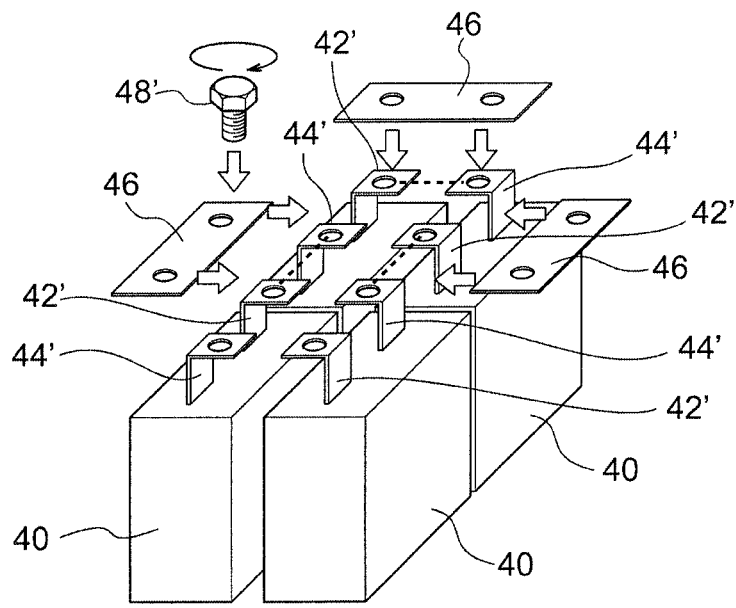
FIG. 6 is an exploded perspective view illustrating another example connection of battery units.

The joint 46 preferably has holes for connection to the positive electrode terminal 42 or the negative electrode terminal 44. The joint 46 typically has two holes, that is, the one hole for the positive electrode terminal 42 and the other hole for the negative electrode terminal 44. The diameter of the holes of the joint 46 is preferably slightly larger than the diameter of the positive electrode terminal 42 and negative electrode terminal 44. For example, the diameter of the holes of the joint 46 may be designed to be 4 mm larger than the diameters of the positive electrode terminal 42 and negative electrode terminal 44, and to tolerate a margin of up to ±2 mm in the position of the battery unit 40. As shown in FIG. 5, procedures for connection are preferably as follows. The positive electrode terminal 42 is inserted into the one hole of the joint 46 and the negative electrode terminal 44 is inserted into the other hole. The positive electrode terminal 42 and the negative electrode terminal 44 protruding from the holes are fastened with the fastener 48, such as nuts, to fix the joint 46. Since the positive electrode terminal 42 and the negative electrode terminal 44 are threaded by, for example, tapping, the fastener 48, such as nuts, can be fastened to these terminals. Alternatively, as shown in FIG. 6, the positive electrode terminal 42' and the negative electrode terminal 44' are provided with an L-shaped plate having holes on the bent top face, these holes are aligned to the holes of the joint 46, and the fasteners 48', such as bolts, may be inserted into the aligned holes and fastened. In this connection, the holes of the positive electrode terminal 42' and the negative electrode terminal 44' may be threaded by, for example, tapping, and the fastener 48', such as bolts, may be fastened. Alternatively, the fastener 48', such as a bolt, projecting from the hole may be fastened with another corresponding member, such as a nut. Preferred examples include weld nuts.

(4) Formation of Rectangular Housing

The top frame structure 20 is fixed to the bottom frame structure 10 with the pillars 30 therebetween to form a frame structure of a rectangular housing accommodating the battery units 40, for example, as shown in FIG. 2. According to the present invention, the frame structure of the rectangular housing can be formed merely by fixing the top frame structure 20 to the bottom frame structure 10 with the pillars 30 therebetween, thereby the battery module can be readily assembled.

Although the frame structure can be fixed with the pillar 30 by any known process, the detachable fixing without welding is preferred. In this process, the frame structure (e.g., the top frame structure 20) can be readily detached as needed, resulting in facilitated operations, such as maintenance and replacement of the battery units 40. As described above, each of the pillars 30 has the engaging portion 32 engageable with the bottom frame structure 10 or the top frame structure 20 at one end thereof, and is preferably fixed to the bottom frame structure 10 or the top frame structure 20 with the engaging portion 32. For example, as shown in FIG. 1, the engaging portion 32 has an end plate 32a that can be in surface contact with the bottom frame structure 10 or the top frame structure 20, and the end plate 32a may be fastened to the bottom frame structure 10 or the top frame structure 20 with a fastener (not shown in the drawing). In the case that holes engageable with the fastener may be formed in the end plate 32a, similar holes engageable with the fastener may preferably be formed at a portion, in surface contact with the end plate 32a, of the bottom frame structure 10 or the top frame structure 20. Examples of such fasteners include bolts and nuts.

A grid or ladder area of the top frame structure 20 may be optionally covered with an insulating protective cover after the battery module is formed. Such a cover can protect the positive electrode terminal 42 and the negative electrode terminal 44. The insulating protective cover is preferably made of a resin sheet. The protective cover may include a detachable cover segment that covers a positive electrode terminal 42 (the main terminal of the positive electrodes) at one end of the array of connected battery units 40 and another detachable cover segment that covers a negative electrode terminal 44 (the main terminal of the negative electrodes) at the other end. In this case, wiring connection is carried out to the main terminal of the positive electrodes and the main terminal of the negative electrodes, and then the protective cover segments are attached on the respective areas and are integrated with a main part of protective cover.

One battery unit 40 is preferably disposed in one opening formed by the longitudinal bottom frame 12 and the lateral bottom frame 14. In addition, one battery unit 40 is preferably disposed in one opening formed by the longitudinal top frame 22 and the lateral top frame 24. Accordingly, the number of components in the frame structure can be significantly reduced, resulting in more effectively achieving a reduction in manufacturing cost, an improvement in heat dissipation, and a weight reduction.

EXAMPLES

The invention will now be illustrated in more detail by the following examples.

Figure 7:
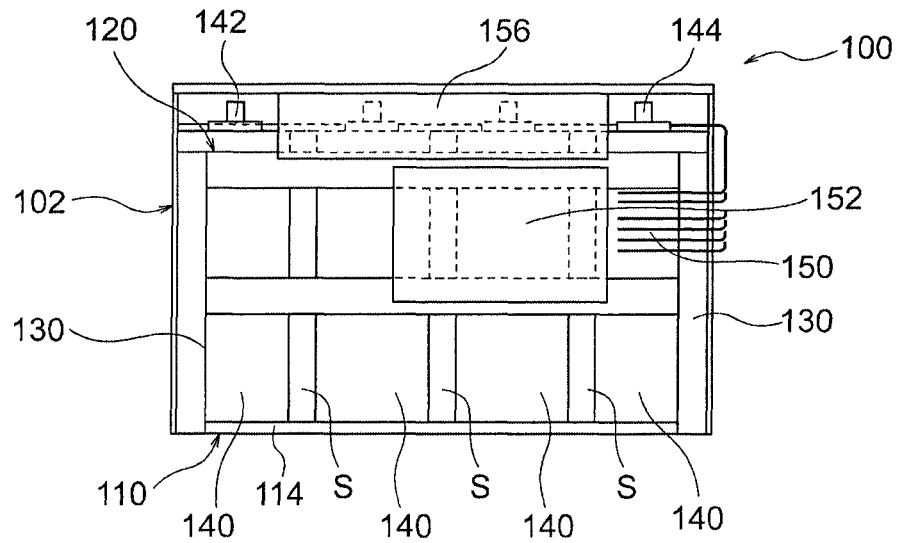
FIG. 7 is a front view illustrating an example battery module according to the present invention.
Figure 8:
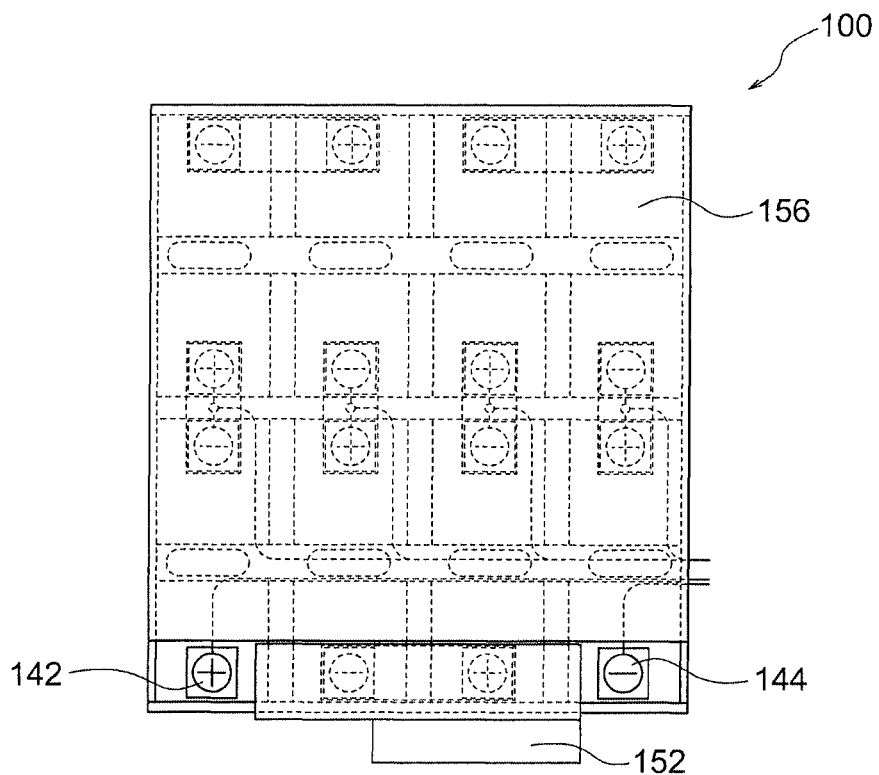
FIG. 8 is a top view of the battery module shown in FIG. 7.
Figure 9:
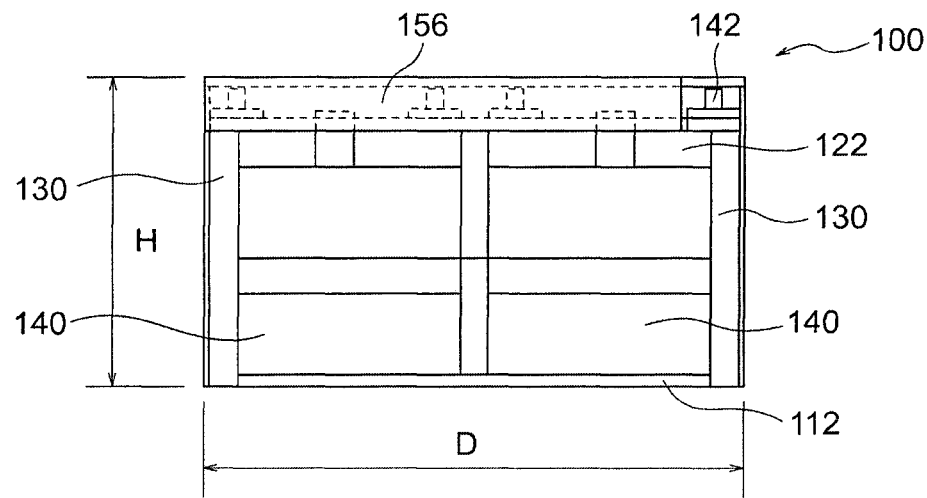
FIG. 9 is a left side view of the battery module shown in FIG. 7.
Figure 10:
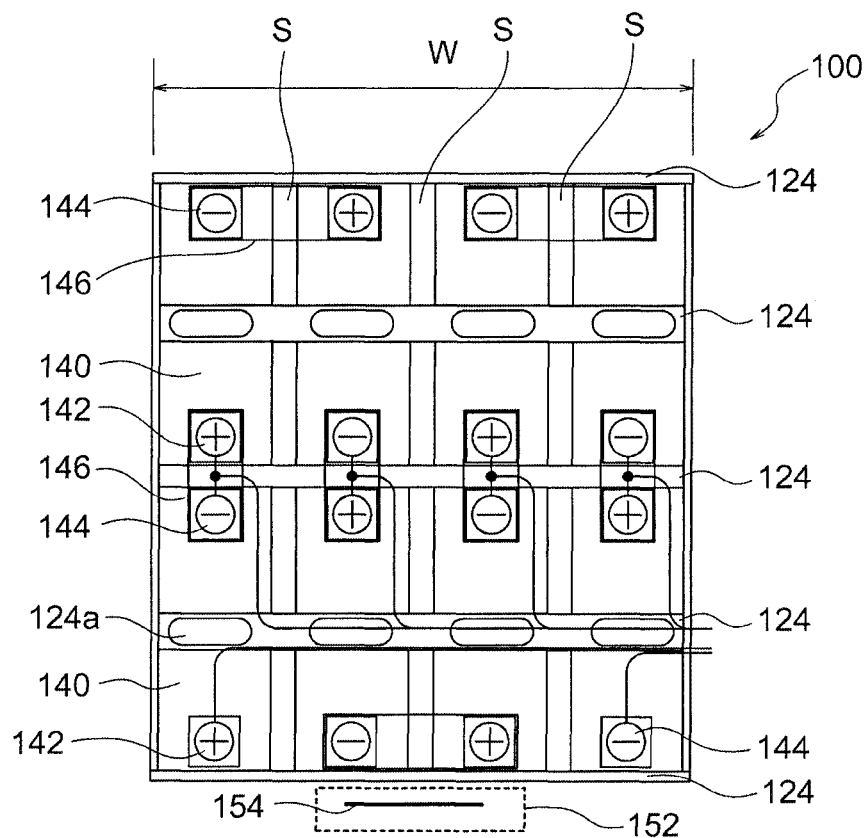
FIG. 10 is a top view of the battery module shown in FIG. 7 from which a protective cover is removed.

FIGS. 7 to 10 illustrate an example battery module manufactured with the frame assembly kit in the present invention. FIGS. 7, 8 and 9, respectively, illustrate a front view, a top view, and a left side view of the battery module 100. FIG. 10 illustrates a top view of the battery module 100 from which a protective cover is removed.

The battery module 100 shown in FIGS. 7 to 10 includes a frame structure 102 of a rectangular housing having a lateral dimension W of 220 mm (see FIG. 10), a longitudinal dimension D of 250 mm (see FIG. 9) and a height H of 140 mm (see FIG. 9). The frame structure 102 is a combination of a bottom frame structure 110 and a top frame structure 120 provided with pillars 130. All the bottom frame structure 110, the top frame structure 120, and the pillars 130 are made of aluminum and provided with holes. The bottom frame structure 110 is provided with guide plates (not shown in the drawing) such that eight battery units 140 can be regularly mounted two in column and four in row. The eight battery units 140 are regularly mounted along the guide plates. The guide plates are designed such that spacer regions S having a predetermined interval are defined between the battery units 140 adjacent to each other in the lateral direction, and high air flow between the battery units 140 is ensured in combination with bottom air vents (not shown in the drawing) located below and top air vents located above the spacer regions. Each of battery units 140 includes a nickel-zinc secondary battery housed in a resin container, and has a rectangular outer shape being 45 mm wide, 115 mm long, and 120 mm high. Multiple nickel-zinc cells are accommodated in the form of a battery assembly in the resin container. The eight battery units 140 are disposed such that the positive electrode terminals 142 and the negative electrode terminals 144 of the adjacent battery units 140 are alternately positioned. The battery units 140 are connected in series through connection of the positive electrode terminal 142 of a battery unit 140 to the negative electrode terminal 144 of the adjacent battery unit 140 through the conductive joint 146. The conductive joint 146 is a bus bar, or a metal plate. The joint 146 is fixed to the positive electrode terminal 142 and the negative electrode terminal 144 with a fastener 148 (not shown in the drawing), thereby the eight battery units 140 are fixed from one another.

Signal lines 150 are attached to the positive electrode terminal 142 or the negative electrode terminal 144 of each battery unit 140 through the joint 146. Two of the lateral top frames 124 have the form of wiring trays including openings 124a. The signal lines 150 from the joint 146 extend along the top frame structure 120 through the openings 124a, and are connected to a CMU board 154 in a cell monitoring unit (CMU) 152 disposed on the side face of the battery module 100 in the form of a wire harness. The cell monitoring unit (CMU) 152 measures the voltage and temperature of the battery unit 140, and can achieve delivery of data from and to the host controller. The CMU board 154 is responsible for a central function of the data delivery.

As shown in FIGS. 7 to 9, the top surface of the battery module 100 is covered with a resin protective cover 156 while the positive electrode terminal 42 (the main terminal of positive electrode) located at one end of the array of battery units 140 connected in series and the negative electrode terminal 44 (a main terminal of negative electrode) located at the other end are exposed.

What is claimed is:

1. A frame structure assembly kit for accommodating a plurality of battery units in a form of a battery module, the frame structure assembly kit comprising:
a bottom frame structure including a plurality of longitudinal bottom frames and a plurality of lateral bottom frames assembled into a grid or ladder, wherein a part of the longitudinal bottom frames bends or extends upward to form at least two guides for determining the position of each battery unit;
a top frame structure including a plurality of top longitudinal frames and a plurality of top lateral frames assembled into a grid or ladder; and
a plurality of pillars having a length corresponding to a height of the battery units for connecting four corners of the bottom frame structure to respective four corners of the top frame structure into a rectangular housing capable of accommodating the battery units,
wherein the battery unit has a rectangular shape, and the guide determines the position of the battery unit such that a longitudinal direction of each battery unit can be directed parallel to the longitudinal bottom frame,
wherein the bottom frame structure is configured such that the at least two guides that are laterally adjacent are separately placed to define spacer regions, thereby the battery units can be separately mounted from one another onto the bottom frame structure,
wherein the bottom frame structure has bottom air vents just below the spacer regions, and the bottom air vents are defined by the longitudinal bottom frames separately disposed from one another,
wherein the bottom frame structure has through holes formed between adjacent longitudinal bottom frames and between adjacent lateral bottom frames,
wherein the bottom frame structure is configured such that each of the through holes is blocked by the bottom of a battery unit when accommodating the plurality of battery units,
wherein the longitudinal bottom frames defining the spacer region are separated at a first uniform interval, the longitudinal bottom frames forming the though holes are separated at a second uniform interval, and the longitudinal top frames are separated so as to correspond to the first uniform interval and the second uniform interval of the longitudinal bottom frames, and
wherein each of the longitudinal bottom frames is in contact with at least two of the lateral bottom frames.

2. The frame structure assembly kit according to claim 1, wherein the pillars are fixed to respective corners of either the top frame structure or the bottom frame structure, thereby the pillars function as parts of the top frame structure or the bottom frame structure.

3. The frame structure assembly kit according to claim 1, wherein the bottom frame structure is an integrated structure and/or the top frame structure is an integrated structure.

4. The frame structure assembly kit according to claim 1, wherein the top frame structure has top air vents in areas corresponding to the spacer regions, and the top air vents are defined by the longitudinal top frames separately disposed from one another.

5. The frame structure assembly kit according to claim 1, wherein the bottom longitudinal frame and/or the bottom lateral frame providing each guide of the at least two guides are L-shaped angle members, and a vertical portion of the L-shaped angle member constitutes each guide of the at least two guides.

6. The frame structure assembly kit according to claim 1, wherein the bottom frame structure has each guide of the guides the at least two guides such that the battery units can be mounted two or more in column and two or more in row.

7. The frame structure assembly kit according to claim 1, wherein each of the pillars has an engaging portion engageable with the bottom frame structure or the top frame structure at one end thereof.

8. The frame structure assembly kit according to claim 7, wherein the engaging portion has an end plate capable of being in surface contact with the bottom frame structure or the top frame structure, and the end plate is capable of being fastened to the bottom frame structure or the top frame structure with a fastener.

9. The frame structure assembly kit according to claim 1, wherein all the bottom frame structure, the top frame structure, and the pillars are made of metal.

10. A method of manufacturing a battery module using the frame structure assembly kit according to claim 1, comprising:
providing the frame structure assembly kit;
conducting the battery units along the respective at least two guides and placing the battery units at predetermined positions on the bottom frame structure, thereby regularly mounting the battery units onto the bottom frame structure;
connecting the battery units in series or in parallel into the battery module; and fixing the top frame structure to the bottom frame structure with the pillars therebetween into the frame structure having the rectangular housing accommodating the battery units.

11. The method according to claim 10, wherein the battery units are connected in series and mounted such that the positive electrode terminal and the negative electrode terminal of adjacent battery units are alternately placed, and the positive electrode terminal and the negative electrode terminal of the adjacent battery units are connected through a conductive joint to connect the battery units.

12. The method according to claim 11, wherein the joint is fixed to the positive electrode terminal and the negative electrode terminal with a fastener, thereby the battery units are fixed from one another.

13. The method according to claim 10, further comprising disposing cushioning materials at areas where the battery units are to be mounted onto the bottom frame structure before the battery units are mounted.

14. The method according to claim 10, wherein the battery units include alkaline secondary batteries housed in a resin container.

15. A battery module comprising:
the frame structure having the rectangular housing manufactured using the frame structure assembly kit according to claim 1; and
a plurality of battery units accommodated in the frame structure and regularly mounted along the guides.

16. A frame structure assembly kit for accommodating a plurality of battery units in a form of a battery module, the frame structure assembly kit comprising:
a bottom frame structure including a plurality of longitudinal bottom frames and a plurality of lateral bottom frames assembled into a grid or ladder, wherein a part of the longitudinal bottom frames bends or extends upward to form at least two guides for determining the position of each battery unit;
a top frame structure including a plurality of top longitudinal frames and a plurality of top lateral frames assembled into a grid or ladder; and
a plurality of pillars having a length corresponding to a height of the battery units for connecting four corners of the bottom frame structure to respective four corners of the top frame structure into a rectangular housing capable of accommodating the battery units,
wherein the bottom longitudinal frame providing the guide is an L-shaped angle member, and a vertical portion of the L-shaped angle member constitutes each guide of the at least two guides,
wherein the bottom frame structure has through holes formed between adjacent longitudinal bottom frames and between adjacent lateral bottom frames,
wherein the bottom frame structure is configured such that each of the through holes is blocked by the bottom of a battery unit when accommodating the plurality of battery units,
wherein the longitudinal bottom frames forming the though holes are separated at a uniform interval, and the longitudinal top frames are separated so as to correspond to the uniform interval of the longitudinal bottom frames, and
wherein each of the longitudinal bottom frames is in contact with at least two of the lateral bottom frames.

17. The frame structure assembly kit according to claim 16, wherein the pillars are fixed to respective corners of either the top frame structure or the bottom frame structure, thereby the pillars function as parts of the top frame structure or the bottom frame structure.

18. The frame structure assembly kit according to claim 16, wherein the bottom frame structure is an integrated structure and/or the top frame structure is an integrated structure.

19. The frame structure assembly kit according to claim 16, wherein the bottom frame structure has each guide of the at least two guides such that the battery units can be mounted two or more in column and two or more in row.

20. The frame structure assembly kit according to claim 16, wherein each of the pillars has an engaging portion engageable with the bottom frame structure or the top frame structure at one end thereof.

21. The frame structure assembly kit according to claim 20, wherein the engaging portion has an end plate capable of being in surface contact with the bottom frame structure or the top frame structure, and the end plate is capable of being fastened to the bottom frame structure or the top frame structure with a fastener.

22. The frame structure assembly kit according to claim 16, wherein all the bottom frame structure, the top frame structure, and the pillars are made of metal.

23. A frame structure assembly kit for accommodating a plurality of battery units in a form of a battery module, the frame structure assembly kit comprising:
a bottom frame structure including a plurality of longitudinal bottom frames and a plurality of lateral bottom frames assembled into a grid or ladder, wherein a part of the longitudinal bottom frames bends or extends upward to form at least two guides for determining the position of each battery unit;
a top frame structure including a plurality of top longitudinal frames and a plurality of top lateral frames assembled into a grid or ladder; and
a plurality of pillars having a length corresponding to a height of the battery units for connecting four corners of the bottom frame structure to respective four corners of the top frame structure into a rectangular housing capable of accommodating the battery units,
wherein all the bottom frame structure, the top frame structure, and the pillars are made of metal,
wherein the bottom frame structure has through holes formed between adjacent longitudinal bottom frames and between adjacent lateral bottom frames,
wherein the bottom frame structure is configured such that each of the through holes is blocked by the bottom of a battery unit when accommodating the plurality of battery units,
wherein the longitudinal bottom frames forming the though holes are separated at a uniform interval, and the longitudinal top frames are separated so as to correspond to the uniform interval of the longitudinal bottom frames, and
wherein each of the longitudinal bottom frames is in contact with at least two of the lateral bottom frames.

24. The frame structure assembly kit according to claim 23, wherein the pillars are fixed to respective corners of either the top frame structure or the bottom frame structure, thereby the pillars function as parts of the top frame structure or the bottom frame structure.

25. The frame structure assembly kit according to claim 23, wherein the bottom frame structure is an integrated structure and/or the top frame structure is an integrated structure.

26. The frame structure assembly kit according to claim 23, wherein the bottom frame structure has the guides such that the battery units can be mounted two or more in column and two or more in row.

27. The frame structure assembly kit according to claim 23, wherein each of the pillars has an engaging portion engageable with the bottom frame structure or the top frame structure at one end thereof.

28. The frame structure assembly kit according to claim 27, wherein the engaging portion has an end plate capable of being in surface contact with the bottom frame structure or the top frame structure, and the end plate is capable of being fastened to the bottom frame structure or the top frame structure with a fastener.

* * * * *